United States Patent
Eun et al.

(10) Patent No.: US 7,455,940 B2
(45) Date of Patent: Nov. 25, 2008

(54) METHOD FOR FABRICATING COLOR FILTER ARRAY SUBSTRATE

(75) Inventors: Chong Chan Eun, Kyongsangbuk-do (KR); Dong Hyo Gu, Kyonggi-do (KR); Jung Young Yu, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 727 days.

(21) Appl. No.: 10/986,036

(22) Filed: Nov. 12, 2004

(65) Prior Publication Data
US 2005/0136342 A1 Jun. 23, 2005

(30) Foreign Application Priority Data
Dec. 18, 2003 (KR) .................. 10-2003-0093434

(51) Int. Cl.
*G02B 5/20* (2006.01)
*G02F 1/1335* (2006.01)
(52) U.S. Cl. .......................................................... 430/7
(58) Field of Classification Search .................. None
See application file for complete search history.

(56) References Cited

U.S. PATENT DOCUMENTS

| | | | |
|---|---|---|---|
| 5,439,582 A | 8/1995 | Oka et al. | |
| 5,712,065 A | 1/1998 | Chiang | |
| 6,344,300 B1 | 2/2002 | Baba et al. | |
| 2005/0064307 A1 * | 3/2005 | Fujimori | 430/7 |

FOREIGN PATENT DOCUMENTS

| | | | |
|---|---|---|---|
| DE | 38 42 507 | | 6/1989 |
| EP | 0 571 625 | | 12/1993 |
| EP | 0 633 296 | | 1/1995 |
| EP | 0 683 434 | A1 * | 11/1995 |
| EP | 0 821 275 | | 1/1998 |
| JP | 02-160203 | | 6/1990 |
| JP | 07-43514 | | 2/1995 |
| JP | 9-159814 | | 6/1997 |

* cited by examiner

*Primary Examiner*—John A. McPherson
(74) *Attorney, Agent, or Firm*—Morgan, Lewis & Bockius LLP

(57) ABSTRACT

A method for fabricating a color filter array substrate includes forming a black matrix on a substrate, depositing a color resist on the substrate and the black matrix, and patterning the color resist to form a color filter layer. The color resist has a boiling point in a range of about 70 to 80 degrees Celsius and has a viscosity in a range of about 3 to 5 centipoise and has a solid particle content below or equal to about 20 percent.

10 Claims, 9 Drawing Sheets

METHOD FOR FABRICATING COLOR FILTER ARRAY SUBSTRATE

This application claims the benefit of Korean Application No. P2003-093434, filed on Dec. 18, 2003, which is hereby incorporated by reference.

BACKGROUND OF THE INVENTION

1. Field of the Invention

The present invention relates to a method for fabricating a liquid crystal display device, and more particularly, to a method for fabricating a color filter array substrate of a liquid crystal display device.

2. Discussion of the Related Art

With the development of an information society, various types of display devices have been in great demand. Accordingly, much effort has been made to research and develop various flat display devices, such as liquid crystal displays (LCDs), plasma display panels (PDPs), electroluminescent displays (ELDs), and vacuum fluorescent displays (VFDs). Some species of the flat display devices have been already utilized as displays of various types of equipment. Among those, the LCD device has been the most popular due to thin profile, lightweight, low power consumption, etc., and has been regarded as a substitute for the cathode ray tube (CRT). For example, the LCD device may be utilized as a display for a lap-top computer, a pocket computer, or any monitor of a display device mountable on an automobile or a television screen to display broadcasting signals.

The LCD device mainly includes a color filter substrate as an upper substrate, a thin film transistor (TFT) array substrate as a lower substrate, which face each other, and a liquid crystal layer having a dielectric anisotropy formed between the two substrates. The LCD device is operated by applying a voltage to a corresponding unit using a switching operation of a TFT added to several hundred thousand pixels through a pixel selecting address line.

The color filter substrate includes red, green, and blue color filter layers sequentially aligned and each representing a corresponding color, a black matrix separating each of the red, green, and blue color filter layers and blocking light therebetween, and a common electrode for applying a voltage to the liquid crystal layer. Each of the three color filter layers is independently operated, and the color of a single pixel is represented by any one of the three colors or by a combination of at least two of the three colors.

Related art methods for fabricating the color filter array substrate include a dye method and a pigment method depending upon the material of an organic filter utilized in a process for fabricating the color filter layer. The fabricating process may include a coloring (or dyeing) method, a dispersion method, a coating method, an electrodeposition method, and an ink-jet method. Recently, the pigment dispersion method has been widely utilized for fabricating the color filter layer, and a description thereof will now be given in detail below.

FIGS. 1A to 1G illustrate cross-sectional views showing the related art pigment dispersion method. As shown in FIG. 1A, an insulating substrate 11 is washed, and then either a metal, such as chromium oxide ($CrO_x$) or chromium (Cr), having an optical density of at least 3.5, or a carbon group organic material is deposited on the insulating substrate 11. After that, the insulating substrate 1 is patterned through a photolithography process to form a black matrix 13. Herein, the black matrix 13 is formed so that the edge portion of a unit pixel and the region for forming a TFT correspond to each other, thereby blocking the light emitted from a light source in a region having an unstable electric field.

After the black matrix 13 is thus formed, a color resist including a pigment for representing colors is deposited with a thickness in the range of about 1 to 3 micrometers (μm) on the entire surface of the insulating substrate 11. A first color resist layer 14a dyed in red is first deposited on the insulating substrate 11 to completely cover the black matrix 13.

The color resist can be deposited using either of a spinning method or a roll coating method. The spinning method drops an adequate amount of the color resist on the insulating substrate 11, and then the insulating substrate 11 is spun at a high speed to uniformly disperse the color resist onto its entire surface. On the other hand, the roll coating method spreads the color resist onto a roll to transfer/print it onto the insulating substrate 11. The essential elements of the color resist include a photopolymerization initiator, which is a photosensitive composition such as a photoresist, a monomer, a binder, and an organic pigment.

Subsequently, as shown in FIG. 1B, apart from a specific region of the first color resist layer 14a (i.e., a region remaining for a pattern), an opaque portion of a mask 17 masks the entire surface of the first color resist layer 14a, and then UV light rays are irradiated thereon to partially expose the first color resist layer 14a. Generally, the color resist for color filters has a negative characteristic of removing a non-exposed portion of the color resist. Therefore, the specific region for forming the pattern of the color resist is exposed through a transparent portion of the mask 17. The light exposing process includes a proximity process exposing a main substrate to sunlight, a stepper process repeatedly exposing a reduced pattern, and a mirror reflection process exposing the substrate 11 by reflecting the mask pattern. A simple matrix LCD prioritizing productivity uses the proximity process, which has poor accuracy but a fast treatment speed. On the other hand, the active matrix LCD requiring high accuracy uses either the stepper process or the mirror reflection process.

As shown in FIG. 1C, the first color resist layer 14a having its photochemical structure modified by exposure is dipped into a developing solution and patterned. The first color resist layer 14a is thus developed to form a first color filter layer 15b as shown in FIG. 1C. The first color filter layer 15a is dyed in red and the non-exposed portion thereof is removed. Thereafter, the first color filter layer 15a is hardened at a high temperature condition of about 230° C. The developing process is performed using one of a dipping method, a bubble method, and a shower spray method.

However, a step difference is generated at an overlapping portion of the first color filter layer 15a and the black matrix 13, and such a problem can be worsened if the black matrix 13 is formed of a thick organic layer of a carbon group. Therefore, to planarize the first color filter layer 15a, a process of depositing an overcoat layer having excellent planarization characteristics is required in a later process.

As shown in FIG. 1D, a second color resist layer 14b dyed in green is deposited on the entire surface of the insulating substrate 11 including the red first color filter layer 15a. Then, apart from a specific region of the second color resist layer 14b, an opaque portion of the mask 17 (which is physically the same mask as that used for patterning the first color resist 14a, but is shifted in position) masks the entire surface of the second color resist layer 14b, and then UV light rays are irradiated thereon to partially expose the second color resist layer 14b. Thereafter, the second color resist layer 14b having its photochemical structure modified by exposure is developed to form a second color filter layer 15b dyed in green, as shown in FIG. 1E. The second color filter layer 15b is formed in a pixel adjacent to the first color filter layer 15a, wherein the black matrix 13 is placed therebetween.

Then, a third color resist layer 14c dyed in blue is deposited on the entire surface of the insulating substrate 11 including the first and second color filter layers 15a and 15b. Then, apart from a specific region of the third color resist layer 14c, an opaque portion of the mask 17 masks the entire surface of the color resist layer 14c, and then UV light rays are irradiated thereon to partially expose the third color resist layer 14c. Thereafter, the third color resist layer 14c having its photochemical structure modified by exposure is developed to form a third color filter layer 15c dyed in blue, as shown in FIG. 1F.

The third color filter layer 15c is formed in a pixel adjacent to the second color filter layer 15b, wherein the black matrix 13 is placed therebetween, thereby completing a color filter layer 15 having a multi-layered structure of red (R), green (G), and blue (B) color filter layers 15a, 15b and 15c. Generally, the color filter layer 15 is formed in the order of R, G, and B.

Subsequently, as shown in FIG. 1G, to protect and planarize the color filter layer 15, an acrylic resin or a polyamide resin is utilized to deposit a planarization layer on the entire surface of the insulating substrate 11 including the color filter layer 15 by means of a spin-coating method, thereby forming a transparent overcoat layer 16.

Finally, an indium tin oxide (ITO) layer 18, which is a transparent material having excellent transmissivity, conductivity, and chemical and thermal stability, is deposited on the overcoat layer 16 by means of a sputtering method as a common electrode. The common electrode 18 operates the liquid crystal layer as well as the pixel electrode formed on the TFT array substrate. Herein, depending upon the type of the LCD device, the process of forming the ITO layer 18 on the overcoat layer 16 may be omitted. Thus, the method for fabricating the color filter array substrate including the black matrix 13, the color filter layer 15, and the overcoat layer 16 or the common electrode 18 is completed.

However, the related art method for fabricating the color filter array substrate has the following disadvantages. As each of the red (R), green (G), and blue (B) color filter layers is formed through a separate process, a step difference may be formed between the R, G, and B color filter layers depending upon the characteristic of the color filter and the degree of exposure to light. As a result, to planarize the color filter layer having a step difference, a process of selecting a transparent organic material having an excellent planarization characteristic and forming an overcoat layer is required, thereby complicating the fabrication process and increasing the fabrication costs and time.

Additionally, by forming the overcoat layer, the color filter array substrate becomes thicker, thereby resulting in limitations for forming thin and lightweight liquid crystal panels. Also, since a passivation layer cannot be rubbed at an area having the step difference formed in the color filter layer, the alignment of liquid crystal molecules in the corresponding area becomes difficult, thereby causing the problem of disclination.

SUMMARY OF THE INVENTION

Accordingly, the present invention is directed to a method for fabricating a color filter array substrate that substantially obviates one or more of the problems due to limitations and disadvantages of the related art.

An object of the present invention is to provide a method for fabricating a color filter array substrate without a step difference.

Another object of the present invention is to provide a method for fabricating a color filter array substrate having improved quality and lowered expenses.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for fabricating a color filter array substrate is provided, including forming a black matrix on a substrate, depositing a color resist on the substrate and the black matrix, and patterning the color resist to form a color filter layer, wherein the color resist has a boiling point in a range of about 70 to 80 degrees Celsius and has a viscosity in a range of about 3 to 5 centipoise and has a solid particle content below or equal to about 20 percent.

In another aspect, a method for fabricating a color filter array substrate includes forming a black matrix on a substrate, depositing a color resist layer on the substrate and the black matrix, placing a mask on the rear surface of the substrate and back-exposing the color resist layer, and developing the color resist layer to form a color filter layer.

In another aspect, a method for fabricating a color filter array substrate includes forming a black matrix on a substrate, depositing color resist on a printing roll, preparing a supporting plate with protrusions that are formed to correspond to the black matrix, rotating the printing roll on the supporting plate so that a first portion of the color resist adheres to the protrusions and a second portion of the color resist remains on the printing roll, rolling the printing roll on the substrate to print the second portion of the color resist between the black matrix, and curing the second portion of the color resist to form a color filter layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

In order to control a step difference of a surface, the step difference should be less than or equal to 0.3 micrometers (μm). However, if the step difference exceeds 0.3 micrometers (μm), then a passivation layer on the surface having the step difference cannot be rubbed, thereby causing a disclination in the surface. In a method for fabricating a color filter array substrate according to an exemplary embodiment of the present invention, a color resist having a high boiling point is used to enhance a taper of a color filter layer.

Figure 1A:
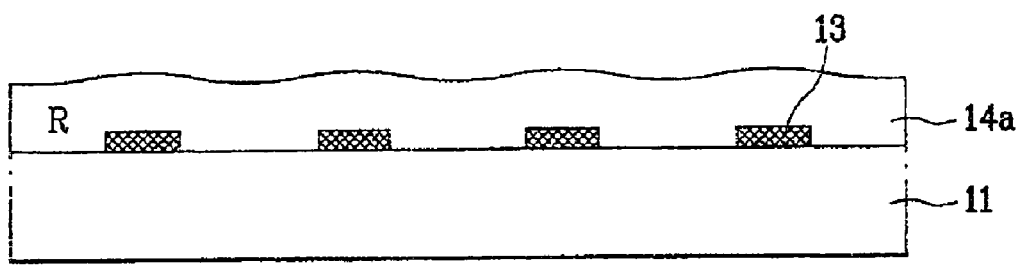
FIGS. 1A to 1G illustrate cross-sectional views showing a related art method for fabricating a color filter array substrate.
Figure 1B:
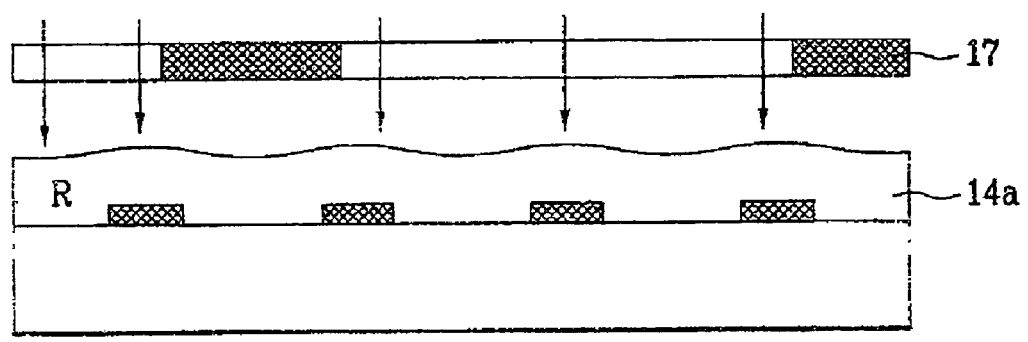
Figure 1C:
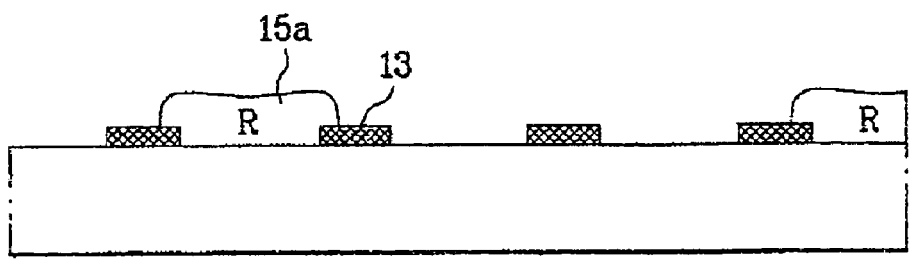
Figure 1D:
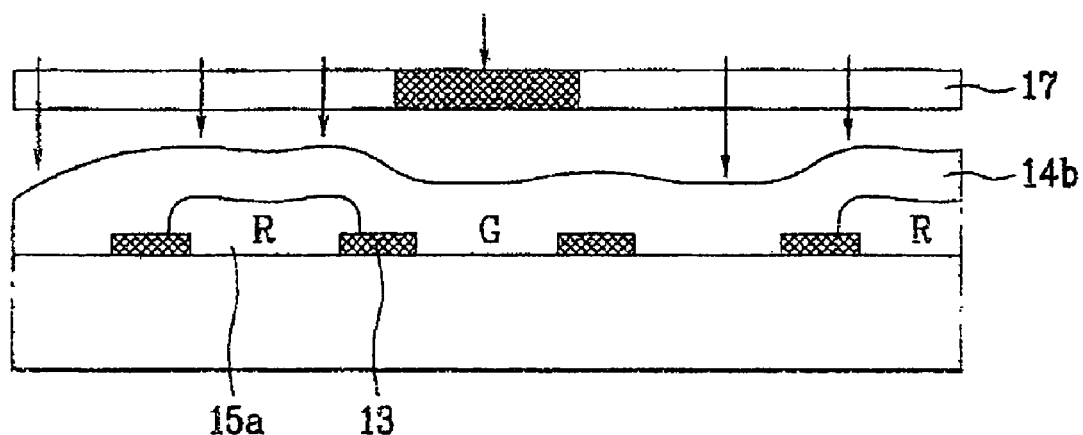
Figure 1E:
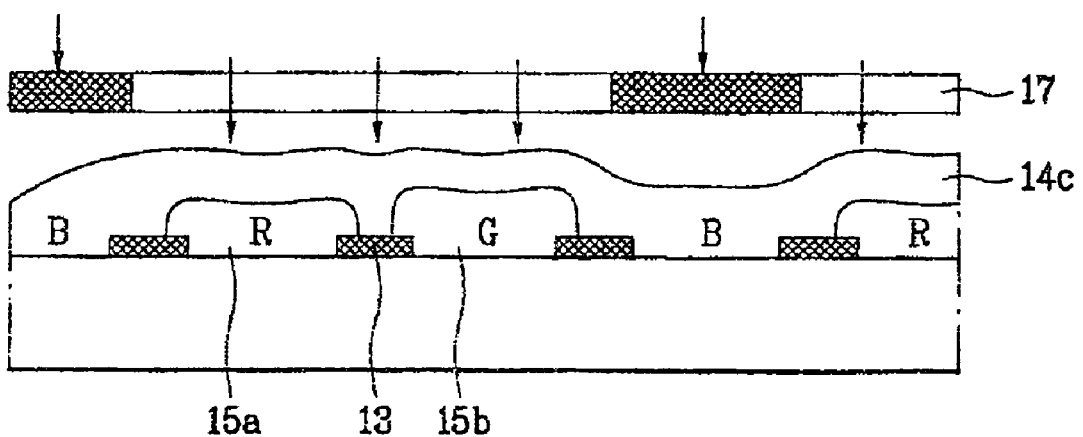
Figure 1F:
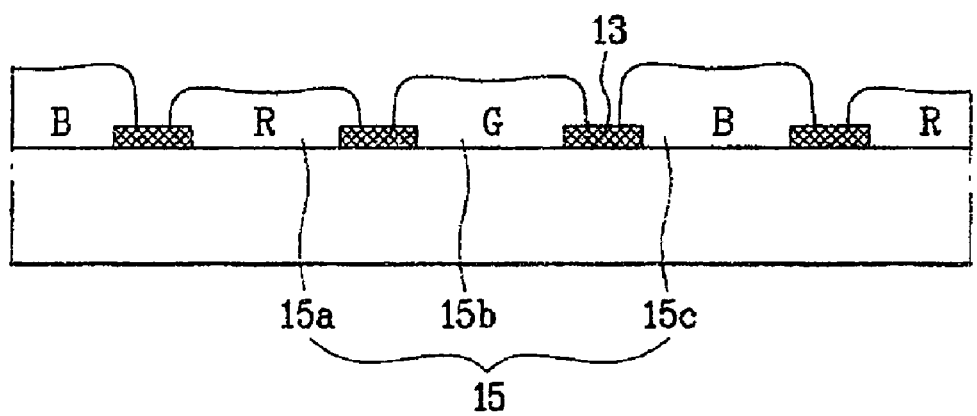
Figure 1G:
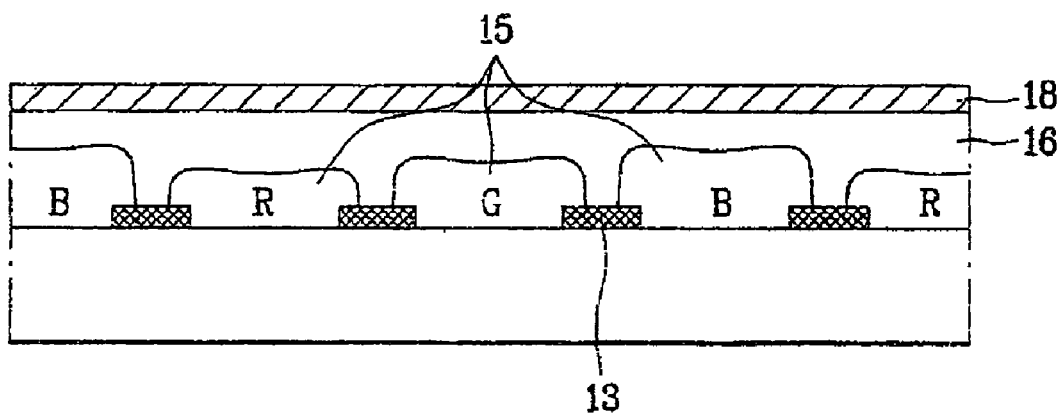
Figure 2:
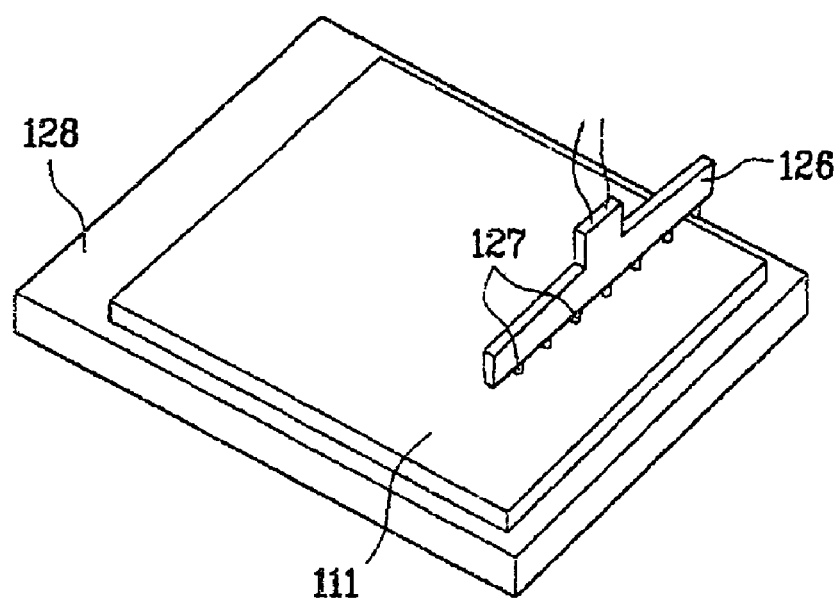
FIG. 2 illustrates a perspective view showing a process of depositing a color resist layer according to an exemplary embodiment of the present invention.
Figure 3:
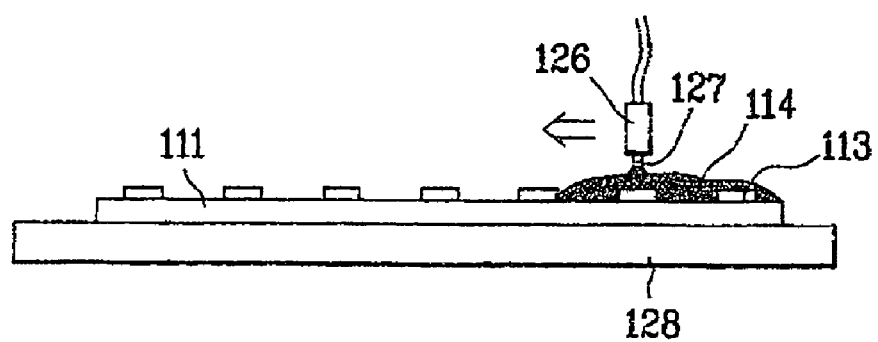
FIG. 3 illustrates a cross-sectional view showing the process of depositing the color resist layer of FIG. 2.

FIG. 2 illustrates a perspective view showing a process of depositing a color resist layer according to the exemplary embodiment of the present invention, and FIG. 3 illustrates a cross-sectional view showing the process of depositing the color resist layer of FIG. 2. A metal is deposited on a transparent glass substrate 111 having a polished surface by means of a sputtering method. Alternatively, an organic material is be deposited on the transparent glass substrate 111. The metal may be chromium oxide ($CrO_x$), chromium (Cr) or the like and has an optical density of at least 3.5. Then, either the metal or the organic material is patterned through photolithography to form a black matrix 113 (of FIG. 3).

The organic material utilized herein may be choose from the group consisting of an organic material including carbon black particles, an organic material using titanium oxide ($TiO_x$) particles, an organic material formed by a color pigment compound, and a compound organic material including at least one of carbon particles, titanium oxide ($TiO_x$) particles and color pigments.

Herein, the black matrix 113 is formed to correspond to an edge portion of a unit pixel and a region for forming a TFT in a thin film array substrate, so that the electric field can block the light source at the unstable region. After the black matrix 113 is thus formed, a negative color resist 114 having a high boiling point characteristic is deposited to have a constant thickness on the entire surface of the substrate 111 including the black matrix 113. Since the color resist 114 has an excellent surface dispersion characteristic, a step difference does not occur even when the color resist 114 is deposited over the black matrix 113 having a set thickness.

The color resist 114 includes at least the following elements: a binder resin, a multi-functional monomer, a UV-hardening resin, a pigment, a solvent, and additives. Herein, the surface dispersion characteristic of the color resist 114 may vary depending upon content of each element. The color resist 114 utilized in the present invention has a boiling point in a range of about 70 to 80 degrees Celsius (° C.), a viscosity in a range of about 3 to 5 centipoise (cp), and a solid content below or equal to about 20 percent (%). However, the color resist utilized in the related art method has a boiling point of about 60 degrees Celsius (° C.), a viscosity in a range of about 7 to 9 centipoise (cp), and a solid content in a range of about 20 to 25 percent (%). More specifically, to increase the boiling point of the color resist of the related art method to a range of about 70 to 80 degrees Celsius (° C.), the content of the binder resin should be changed.

Herein, the binder resin is utilized to enhance compatibility, film formation, development, and adhesion. The widely utilized binder resins include a homopolymer or a copolymer of (meta) acrylic acid, (meta) acrylic ester, (meta) acrylic amide, maleic acid, (meta) acrylo nitrile, styrene, vinyl acetate, vinylidene chloride, and maleimide, polyethylene oxide, polyvinyl pyrrolidene, polyamide, polyurethane, polyester, polyethylene terephtalate, acetyl cellulose, novolak resin, resol resin, and polyvinylphenol or polyvinylbutyral. Among those, the copolymer (also referred to as an acrylic resin) including (meta) acrylic acid or (meta) acrylic ester of a carboxyl group is most preferable. The acrylic resin has excellent development and transparent characteristics and is able to obtain various types of copolymers by selecting various monomers, thereby facilitating the control of function and fabrication method thereof.

Also, to reduce the viscosity to about 3 to 5 centipoise (cp), the content of the solvent should be increased. It is preferable to utilize a solvent that is able to dissolve the UV-hardening resin or a dispersable solvent. Such a solvent may be selected at least from ester groups such as ethyl acetate and butyl acetate, ketone groups such as cyclohexanon and ethyl butyl ketone, alcohol derivatives such as ethylene glycol monoethyl ether acetate and propylene glycol methyl ether acetate, and nitrogen contained groups such as dimethylformamide. These organic solvents may be employed independently or in combination of at least two elements.

Further, to reduce the solid content to a level below or equal to about 20 percent (%), the content of the binder resin or the multi-functional monomer should be increased. The multi-functional monomer is not limited so long as a low molecular compound that can be polymerized is utilized. Herein, the monomer is the opposite of a high polymer, and may include the above-mentioned monomer as well as a dimmer, a trimer, and an oligomer.

The pigment utilized for the color representation of the color resist may be selected from the group including at least azo pigments such as azo lake pigment, insoluble azo pigment, azo condensation pigment, chelate azo pigment, polycyclic pigments such as phthalocyanine pigment, perylene pigment, perinone pigment, anthraquinone pigment, quinacridone pigment, dioxine pigment, thioindigo pigment, isoindolinon pigment, and quinophthalone pigment, organic pigments such as basic pigment type lake, acidic dye lake or nitro pigment, nitorso pigment, and anilin black, and inorganic pigments such as titanium oxide, iron oxide group, and carbon black group. Herein, the organic or inorganic pigments may be employed independently or in combination of at least two elements and is not limited.

Also, the photopolimerization initiator utilized for the photosensitive characteristic of the color resist directly absorbs light or is photosensitized, thereby causing a decomposition reaction or a hydrogen elimination reaction to produce a polymerization active radical. Herein, the photopolymerization initiator includes acrylic ester groups, such as 2-hydroxyethylacrylate, 2-hydroxypropylacrylate, 2-ethylhexacrylate, ethylglycoldiacrylate, diethyleneglycol diacrylate, triethyleneglycolmethacrylate, tetramethylglycol diacrylate, pentaerythritol diacrylate, dipentaerythitol tetra-acrylate, dipentaerythitol hexa-acrylate, glycerolacrylate, and bisphenol epoxy diacrylate. The above-mentioned UV-hardening resin may be utilized independently or in combination of at least two elements and is not limited.

Finally, the additives such as thermal polymerization inhibitor, plasticizer, auxiliary stabilizer, surface protector, leveling agent, coating agent, and so on may be additionally employed in the color resist as required. When the above-described color resist is utilized, a step difference between a portion having the black matrix 113 and a portion having no black matrix 113 formed on a lower surface thereof can be reduced to less than or equal to about 0.3 micrometers (μm).

Since the color resist 114 has an excellent surface dispersion characteristic, a dispensing method is utilized instead of the spin-coating method. More specifically, as shown in FIGS. 2 and 3, a dispenser 126 is moved from one corner of the substrate 111 to another corner of the substrate 111 along either a horizontal or a vertical direction so as to uniformly spray a constant amount of the color resist 114 on the substrate 111 through a spray nozzle 127. Herein, the reference numeral 128 of FIG. 3 denotes a supporting plate 128 for supporting the substrate 111.

Herein, since the color resist 114 of this exemplary embodiment has a low viscosity, the color resist 114 can be easily dispersed, and therefore the spinning process is omitted. If, however, the spinning process is carried out due to the centrifugal force, the color resist 114 may be concentrated near the edge of the substrate 111, thereby causing a step difference.

The plainly deposited color resist 114 is soft-baked at a low temperature condition and is then treated with photolithography including the UV exposure, development and washing processes. Thereafter, the photolithography-treated color resist 114 is patterned and then hard-baked, thereby forming a color filter layer. Generally, since a negative color resist is utilized for forming the color filter layer, the non-exposed portion of the color resist is removed.

As aforementioned, the color filter layers respectively dyed in the colors of red (R), green (G), and blue (B) are sequentially formed in the order of R, G, and B, thereby completing the color filter array substrate of an LCD device for a full-color display device. The color filter layer formed by the above-described fabrication process is a plain layer without the step difference. Therefore, an additional process of forming an overcoat layer to planarize the color filter layer is not required, and the deficiencies caused by rubbing the passivation layer at a step difference area can also be prevented. Furthermore, since an additional overcoat layer is not formed, the fabrication costs can be reduced.

Next, another method for fabricating the color filter array substrate including a color filter layer without the step difference is a printing method. The printing method is utilized to resolve the problems of a complicated patterning method of photolithography and high fabrication costs caused by preparing expensive fabrication equipment. Thus, using the printing method, the fabrication process can be simplified and the fabrication costs can be reduced.

Figure 4A:
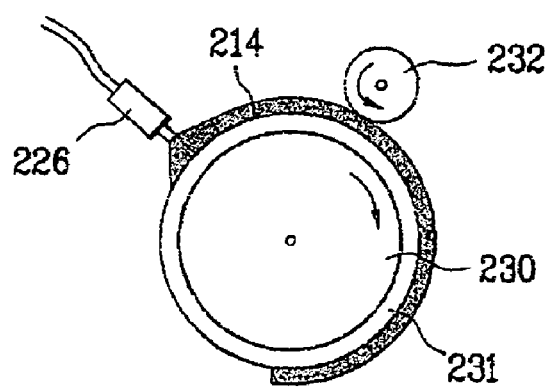
FIGS. 4A to 4C illustrate cross-sectional views showing a method of fabricating a color filter layer according to another exemplary embodiment of the present invention.
Figure 4B:
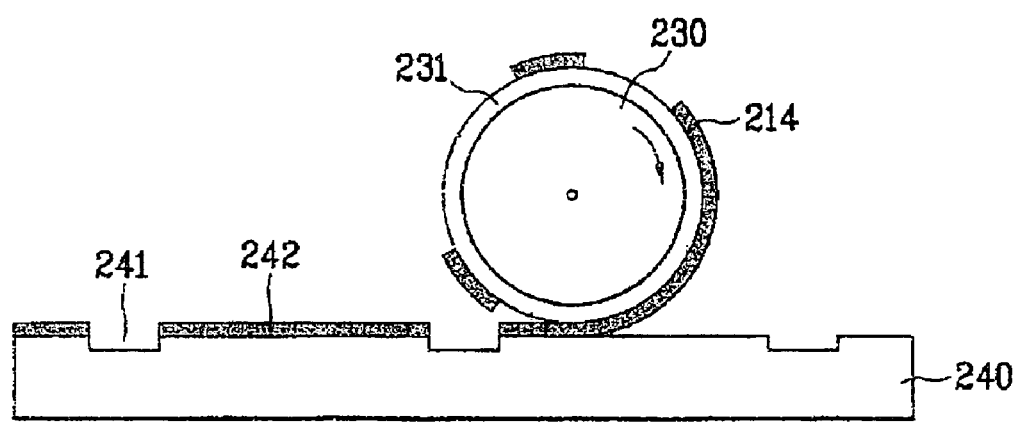
Figure 4C:
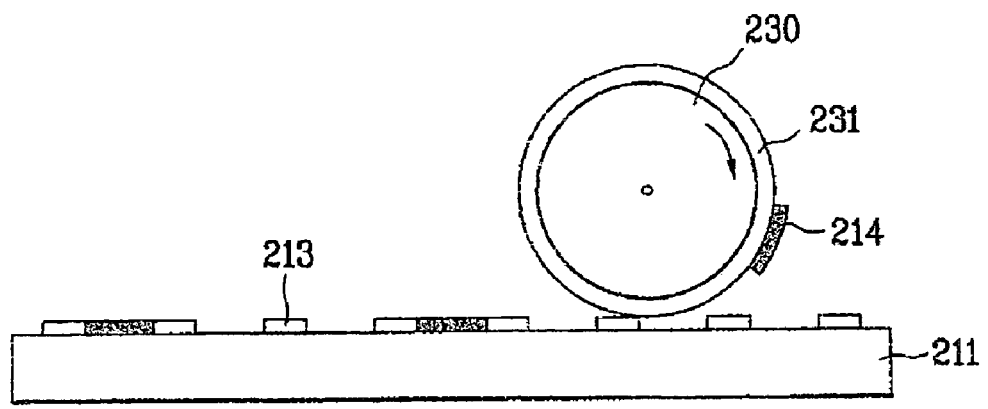

FIGS. 4A to 4C illustrate cross-sectional views showing the printing method for fabricating a color filter layer according to another exemplary embodiment of the present invention. As shown in FIG. 4A, a color resist 214 is smeared on a circumferential surface of a printing roll 230 having a blanket 231 of a rubber material wrapped thereon. More specifically, the color resist 214 is sprayed using a dispenser 226. Then, a doctor roll 232 formed on the circumferential surface of the printing roll 230 along the same axis of the printing roll 230 is pushed and rolled to come into contact with the color resist 214 at a constant interval, thereby evenly smearing the color resist 214 on the circumferential surface of the printing roll 230. A flat spatula-like doctor blade may also be utilized instead of the doctor roll 232.

As shown in FIG. 4B, a cliche 240 having protrusions 242 formed beforehand at a specific position is prepared. The protrusions 242 are positioned to correspond to a pattern, which is to be formed on a transparent insulating substrate 211 (of FIG. 4C). Then, the printing roll 230 having the color resist 214 smeared thereon is pressed and rolled along one direction to be rubbed against the surface of the cliche 240. Thus, while the printing roll 230 rotates, the color resist 214 adheres to the protrusions 242 of the cliche 240. Accordingly, the portion of the color resist 214 corresponding to concave grooves 241 of the cliche 240 remains adhering to the printing roll 230.

At this point, the protrusions 242 correspond to a region where the color resist 214 is formed. In order words, when the R, G, and B color filter layers are formed, during the process of fabricating the red (R) color filter layer, the cliche 240 having protrusions 242 formed at regions corresponding to a black matrix 213 (of FIG. 4C) and the green (G) and blue (B) color filter layers. Further, during the process of fabricating the green (G) color filter layer, the cliche 240 having protrusions 242 formed at regions corresponding to the black matrix 213 and the red (R) and blue (B) color filter layers. Furthermore, during the process of fabricating the blue (B) color filter layer, the cliche 240 having protrusions 242 formed at regions corresponding to the black matrix 213 and the red (R) and green (G) color filter layers.

Thereafter, as shown in FIG. 4C, the transparent insulating substrate 211 having the black matrix 213 formed beforehand as a uniform pattern is prepared. Then, the printing roll 230 is rolled and pushed forward on the substrate 211 along one direction, thereby printing the color resist 214 between the black matrix 213. Subsequently, the printed color resist 214 is cured, thereby completing the color filter layer. By means of the above-described method, the color resists 214 respectively dyed in the colors of red (R), green (G), and blue (B) are sequentially printed, so as to form the color filter layer.

As aforementioned, a single full-rotation rolling of the printing roll 230 allows the color filter layer to be formed in a desired pattern on the entire surface of the substrate 211 of the display device. Thus, the fabrication method may be efficiently applied to wide display devices. Furthermore, since the color filter layer is formed between the black matrix 213, an unbalance in the step difference caused when the color resist 214 overlaps the black matrix 213 can be prevented. In addition, a mark on the substrate 211 and/or on the printing roll 230 may be employed to ensure that components of the color resist 214 on the printing roll 230 are applied to correct positions of the substrate 211 so that any undesired step difference can be avoided.

Nest, in a method for fabricating a color filter array substrate according to further another exemplary embodiment of the present invention, the color filter layer is formed by means of a rear exposure method.

Specifically, when a negative color resist uniformly deposited on a substrate having a black matrix formed thereon is back-exposed from the lower surface of the substrate, a portion of the color resist overlapping the black matrix is blocked by the black matrix, thereby failing to be exposed. And, a portion of the color resist that does not overlap the black matrix is exposed to light. At this point, since a little amount of light is leaked to the edge portion of the black matrix during the back-exposure process, the portion of the color resist overlapping the black matrix can be slightly exposed to light. Therefore, after the development process, the color filter layer overlapping the black matrix is not completely removed and has a small step difference remaining. Therefore, color filter layers of different colors each having a small step difference are formed to overlap one another over the black matrix to compensate the step difference, thereby forming a color filter layer having no step difference.

Figure 5A:
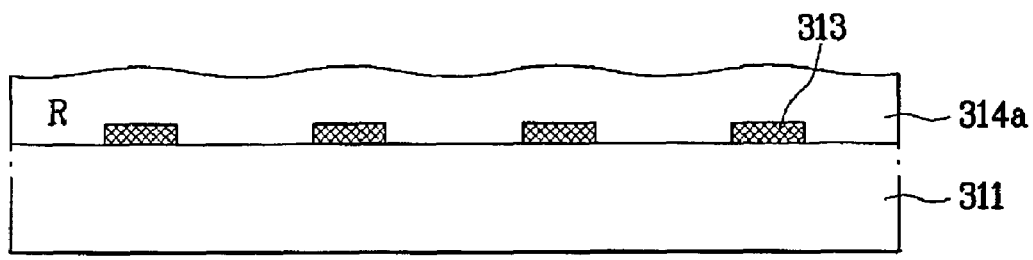
FIGS. 5A to 5F illustrate cross-sectional views showing a method of fabricating a color filter array substrate according to another exemplary embodiment of the present invention.

FIGS. 5A to 5F illustrate cross-sectional views showing the method for fabricating a color filter array substrate according to the exemplary embodiment of the present invention. As shown in FIG. 5A, either a metal is deposited by means of a sputtering method or a carbon group organic material is deposited on a substrate 311 having a polished surface. The metal may be chromium oxide ($CrO_x$), chromium (Cr) or the like and has an optical density of at least 3.5. Then, the deposited metal or the organic material is patterned through photolithography, thereby forming a black matrix 313. Herein, the black matrix 313 is formed to correspond to an edge portion of a unit pixel and a region for forming a TFT in a thin film array substrate, so that the electric field can block light at the unstable region.

Then, a thick layer of a negative color resist having pigments for representing colors included therein is uniformly deposited on the substrate 311 including the black matrix 313 by means of a spinning method and a roll-coating method. A first color resist layer 314a dyed in red is first deposited. The color resist utilized herein may be the same as that of the related art fabrication method, or that having a high boiling point of the exemplary embodiment of the present invention.

Figure 5B:
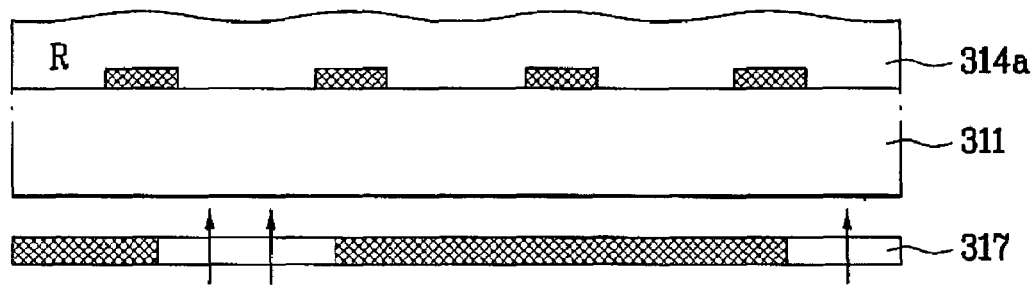

As shown in FIG. 5B, apart from a specific region of the first color resist 314a (i.e., a region remaining for a pattern), an opaque portion of a mask 317 masks the entire surface of the first color resist 314a, and then UV light rays are irradiated thereon to partially expose the first color resist 314a. The mask 317 is placed at a rear surface of the substrate 311, so as to irradiate UV light rays to the rear surface of the substrate 311. Since the color resist used in the color filter layer generally has a negative characteristic, wherein the non-exposed portion of the color resist is removed, the specific region for forming the pattern is exposed through the transparent portion of the mask 317.

Figure 5C:
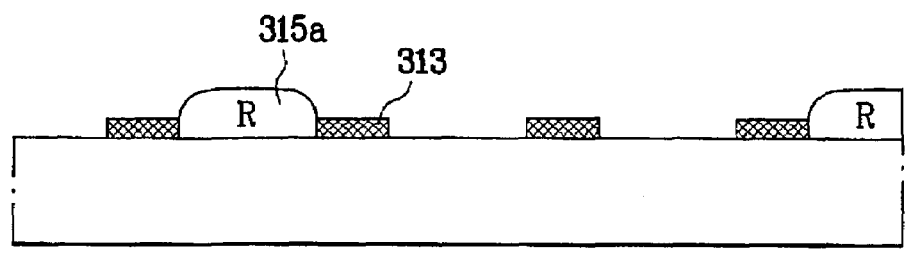

As shown in FIG. 5C, the first color resist layer 314a having its photochemical structure modified by exposure is developed to form a first color filter layer 315a. Then, the portion of the first color filter layer 315a dyed in red remains and the non-exposed portion thereof is removed. Thereafter, the first color filter layer 315a is completely hardened at a high temperature condition of about 230° C. At this point, the first color filter layer 315a exposed between the black matrix 313 is not removed, but the portion of the first color filter layer 315a overlapping the black matrix 313 is removed by a predetermined thickness due to a partial exposure to light leaked to the edge portion of the black matrix 313.

Figure 5D:
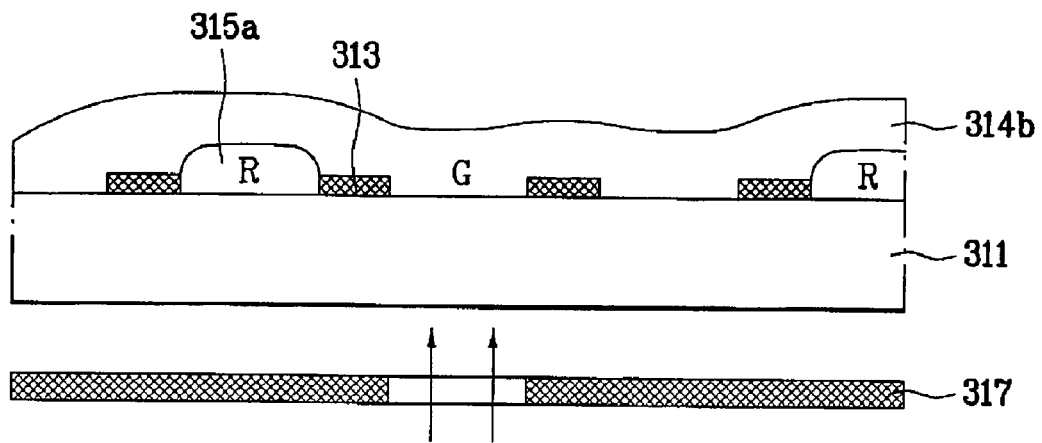
Figure 5E:
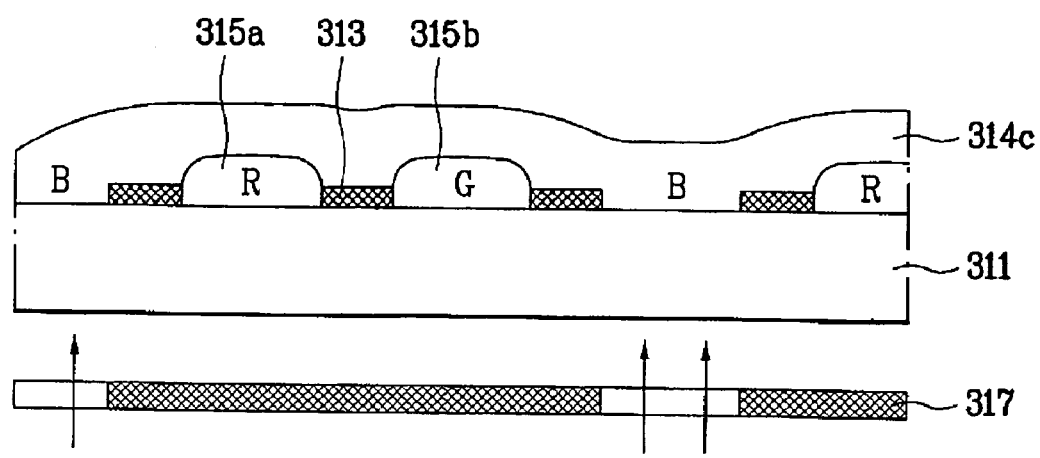

As shown in FIG. 5D, a second color resist layer 314b dyed in green is deposited on the entire surface of the substrate 311 including the red first color filter layer 315a. Then, a mask 317 (which is physically the same mask as that for patterning the first color resist layer 314a, but is shifted in position, i.e. the respective masks are formed by one mask device which is shiftable in order to provide for the respective mask patterns) is placed at the rear surface of the substrate 311, and UV light rays are irradiated on the rear surface of the substrate 311, thereby partially exposing the second color resist layer 314b. Thereafter, the second color resist layer 314b having its photochemical structure modified by exposure is developed to form a second color filter layer 315b dyed in green, as shown in FIG. 5E.

At this point, the second color filter layer 315b exposed between the black matrix 313 is not removed, but the portion of the second color filter layer 315b overlapping the black matrix 313 is removed by a predetermined thickness due to a partial exposure to light leaked to the edge portion of the black matrix. Accordingly, the color filter layers with different colors each having a small step difference are formed to overlap one another over the black matrix 313, thereby compensating the step difference. Thus, the step difference between the overlapping portion of the color filter layer and the black matrix 313 and the portion that does not overlap the black matrix 313 becomes uniform.

Figure 5F:
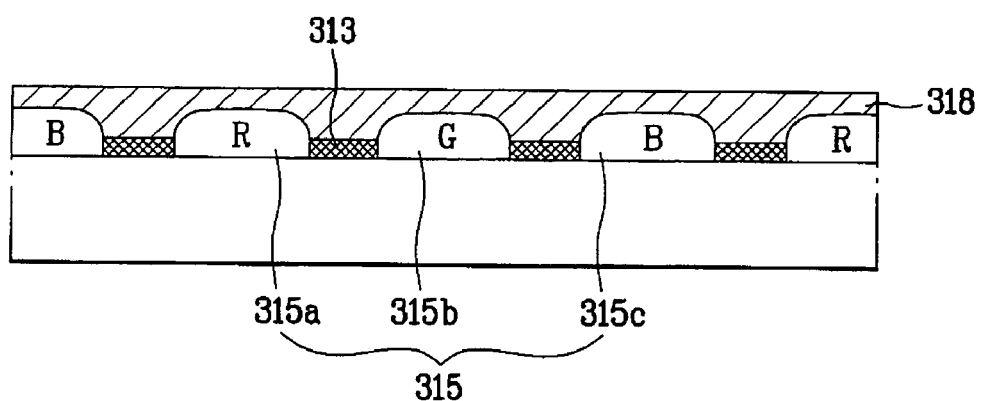

Then, a third color resist layer 314c dyed in blue is deposited on the entire surface of the substrate 311 including the first and second color filter layers 315a and 315b. Then, a mask 317 is placed at the rear surface of the substrate 311, and UV light rays are irradiated on the rear surface of the substrate 311, thereby partially exposing the third color resist layer 314c. Thereafter, the third color resist layer 314c having its photochemical structure modified by exposure is developed to form a third color filter layer 315c dyed in blue, as shown in FIG. 5F.

A small step difference is formed on a portion of the third color filter layer 315c overlapping the black matrix 313. However, the step difference is compensated by the first and second color filter layers 315a and 315b of an adjacent pixel overlapping the third color filter layer 315c. Thus, the step difference on the entire surface of the substrate becomes uniform. Since a planarization process is not required on the color filter layer 315 having a uniform step difference, a common electrode 318 is formed directly on the color filter layer 315.

As described above, in this exemplary embodiment of the present invention, by exposing the color resist from the rear surface of the substrate 311, the step difference of the color filter layer 315 can be controlled using the partial blocking effect of the black matrix 313. At this point, the exposure condition should be adequately controlled to maintain the step difference between the overlapping portion of the color filter layer 315 and the black matrix 313 and the portion that does not overlap the black matrix 313 to be less than or equal to 0.3 micrometers (µm). Generally, the color filter layer 315 is formed in the order of R, G, and B.

After fabricating the color filter layer in accordance with the exemplary embodiments of the present invention, an indium tin oxide (ITO) layer having excellent transmissivity, conductivity, and chemical and thermal stability, may be deposited on the entire surface of the substrate including the color filter layer by means of a sputtering method to form the common electrode 318. Then, a raw material liquid for forming a passivation layer, such as polyamic acid or soluble polyimide, may be deposited on the common electrode 318 which is then hardened, polyimidized, and then rubbed, so as to form the passivation layer. At this point, the step difference of the color filter layer is removed, and so the entire surface of the passivation layer can be uniformly rubbed. Thus, the fabrication of the color filter array substrate including the black matrix, the color filter layer, the common electrode or the passivation layer is completed.

However, in an in-plane switching (IPS) liquid crystal display device, the common electrode is formed on the thin film transistor instead of the color filter array substrate to generate an IPS mode electric field between the common electrode and a pixel electrode of the thin film transistor, thereby controlling the alignment of the liquid crystal molecules. Therefore, the common electrode is not formed on the color filter array substrate of the IPS liquid crystal display device.

The method for fabricating the color filter array substrate according to the present invention has the following advantages. By utilizing a color resist having an excellent dispersion characteristic at a high boiling point, a taper of the color filter layer can be enhanced. By using a printing method or a back exposure method, the step difference of the color filter layer can be controlled, thereby providing a color filter layer having a plain surface. Therefore, an additional process of depositing an overcoat layer for planarizing the color filter layer can be omitted, thereby simplifying the fabrication process and reducing the fabrication costs.

Further, the step difference in the portion of the color filter layer overlapping the black matrix is removed, thereby preventing a disclination caused by a rubbing deficiency at an area having the step difference. Thus, the picture quality of the liquid crystal display device can be enhanced when the device is operated.

Finally, by forming a color filter layer having no step difference, a step coverage of a common electrode or a passivation layer formed on the color filter layer can be enhanced.

It will be apparent to those skilled in the art that various modifications and variations can be made in the method for fabricating a color filter layer of the present invention without departing from the spirit or scope of the inventions. Thus, it is intended that the present invention covers the modifications and variations of this invention provided they come within the scope of the appended claims and their equivalents.

What is claimed is:

1. A method for fabricating a color filter array substrate, comprising:
    forming a black matrix on a substrate;
    depositing a color resist on the substrate and the black matrix, and
    patterning the color resist to form a color filter layer, wherein the color resist has a boiling point in a range of about 70 to 80 degrees Celsius and has a viscosity in a range of about 3 to 5 centipoise and has a solid particle content below or equal to about 20 percent.

2. The method of claim 1, wherein the color resist includes at least a binder resin, a multi-functional monomer, a pigment, a photopolymerization initiator, a solvent, and additives.

3. The method of claim 2, wherein content of the binder resin is controlled so as to keep the boiling point of the color resist in the range of about 70 to 80 degrees Celsius.

4. The method of claim 3, wherein content of the solvent is controlled to keep the viscosity of the color resist in the range of about 3 to 5 centipoise.

5. The method of one of claim 3, wherein content of the binder resin and content of the multi-functional monomer are controlled so as to keep the solid particle content below or equal to about 20 percent.

6. The method of claim 3, wherein the patterning step includes:
    placing a mask on a rear surface of the substrate;
    back-exposing the color resist; and
    developing the color resist to form the color filter layer.

7. The method of claim 2, wherein content of the solvent is controlled to keep the viscosity of the color resist in the range of about 3 to 5 centipoise.

8. The method of one of claim 2, wherein content of the binder resin and content of the multi-functional monomer are controlled so as to keep the solid particle content below or equal to about 20 percent.

9. The method of claim 2, wherein the patterning step includes:
    placing a mask on a rear surface of the substrate;
    back-exposing the color resist; and
    developing the color resist to form the color filter layer.

10. The method of claim 1, wherein the patterning step includes:
    placing a mask on a rear surface of the substrate;
    back-exposing the color resist; and
    developing the color resist to form the color filter layer.

* * * * *